(12) United States Patent
Miglio et al.

(10) Patent No.: US 9,289,725 B2
(45) Date of Patent: Mar. 22, 2016

(54) PROCESS FOR THE PURIFICATION OF AN AQUEOUS STREAM COMING FROM THE FISCHER-TROPSCH REACTION

(75) Inventors: Roberta Miglio, Oleggio (IT); Lino Carnelli, Carbonate (IT); Gabriele Carlo Ettore Clerici, Milan (IT); Roberto Zennaro, Milan (IT)

(73) Assignee: ENI S.p.A., Rome (IT)

( * ) Notice: Subject to any disclaimer, the term of this patent is extended or adjusted under 35 U.S.C. 154(b) by 811 days.

(21) Appl. No.: 13/062,585

(22) PCT Filed: Aug. 7, 2009

(86) PCT No.: PCT/EP2009/005892
§ 371 (c)(1),
(2), (4) Date: May 19, 2011

(87) PCT Pub. No.: WO2010/028731
PCT Pub. Date: Mar. 18, 2010

(65) Prior Publication Data
US 2011/0209391 A1    Sep. 1, 2011

(30) Foreign Application Priority Data

Sep. 9, 2008   (IT) .............................. MI2008A1604

(51) Int. Cl.
| | |
|---|---|
| *C10L 1/18* | (2006.01) |
| *B01D 15/00* | (2006.01) |
| *C02F 1/42* | (2006.01) |
| *B01D 61/36* | (2006.01) |

(Continued)

(52) U.S. Cl.
CPC ................ *B01D 61/362* (2013.01); *B01D 3/14* (2013.01); *B01D 3/145* (2013.01); *C02F 1/448* (2013.01); *B01D 2311/04* (2013.01); *C02F 2103/365* (2013.01)

(58) Field of Classification Search
CPC ................... B01D 2311/04; B01D 2311/2669; B01D 3/14; B01D 3/145; B01D 61/362; C02F 1/448; C02F 2103/365
USPC .............................................. 44/451; 210/640
See application file for complete search history.

(56) References Cited

U.S. PATENT DOCUMENTS

| | | | |
|---|---|---|---|
| 5,230,801 A * | 7/1993 | Darnell et al. ................ | 210/640 |
| 6,620,320 B1 * | 9/2003 | Hying et al. ............ | 210/500.25 |

(Continued)

FOREIGN PATENT DOCUMENTS

WO   2007 081212   7/2007

OTHER PUBLICATIONS

U.S. Appl. No. 12/996,464, filed Mar. 8, 2011, Miglio, et al.

(Continued)

*Primary Examiner* — James Goloboy
*Assistant Examiner* — Latosha Hines
(74) *Attorney, Agent, or Firm* — Oblon, McClelland, Maier & Neustadt, L.L.P.

(57) ABSTRACT

Process for the purification of an aqueous stream coming from the Fischer-Tropsch reaction which comprises: feeding said aqueous stream containing the organic by products of the reaction to one or more pervaporation units, said one or more pervaporation units comprising at least one polymeric pervaporation membrane, obtaining two outgoing streams: —an aqueous stream (i) enriched in alcohols having from 1 to 8 carbon atoms, preferably from 2 to 4 carbon atoms; —an aqueous stream (ii) enriched in water.

38 Claims, 1 Drawing Sheet

Figure 1:
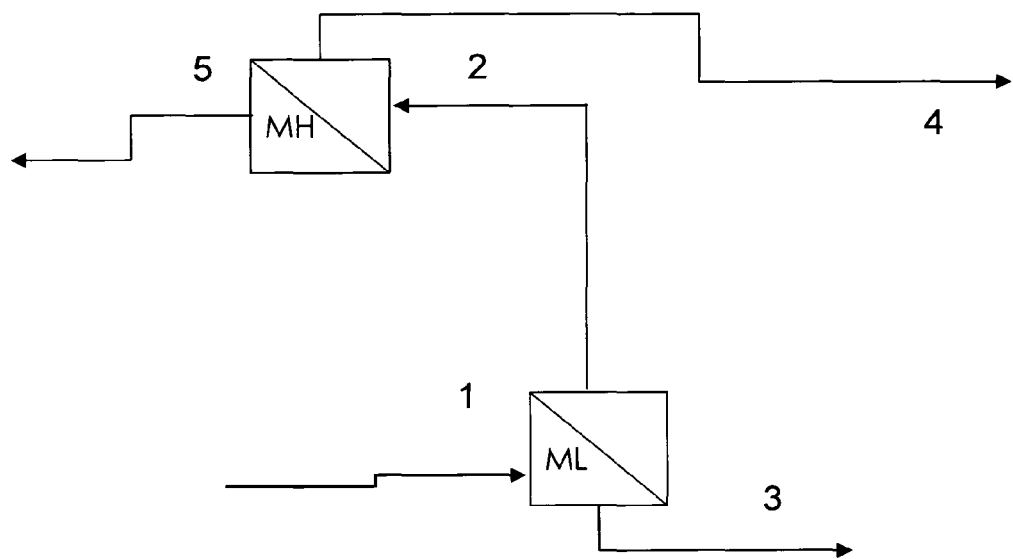

(51) Int. Cl.
B01D 3/14 (2006.01)
C02F 1/44 (2006.01)
C02F 103/36 (2006.01)

(56) References Cited

U.S. PATENT DOCUMENTS

| | | | |
|---|---|---|---|
| 7,141,707 B2 * | 11/2006 | Beckmann et al. | 568/913 |
| 7,153,432 B2 * | 12/2006 | Kohler et al. | 210/640 |
| 8,022,108 B2 * | 9/2011 | Bull et al. | 518/726 |
| 2005/0139555 A1 | 6/2005 | Dancuart Kohler et al. | |
| 2007/0173670 A1 | 7/2007 | Rix et al. | |
| 2008/0187974 A1 | 8/2008 | Rix et al. | |
| 2009/0246114 A1 | 10/2009 | Sah et al. | |
| 2011/0100819 A1 | 5/2011 | Miglio et al. | |

OTHER PUBLICATIONS

U.S. Appl. No. 12/863,101, filed Jan. 18, 2011, Carnelli, et al.
U.S. Appl. No. 13/318,498, filed Nov. 2, 2011, Miglio.
Ballweg, A. H. et al., " Pervaporation Membranes—An Economical Method to Replace Conventional Dehydration And Rectification Columns in Ethanol Distilleries", Proceeding Fifth International Alcohol Fuel Technology Symposium, vol. 1, pp. 1-97-1-I06, XP009086757, (May 13 -18, 1982).
International Search Report issued Nov. 26, 2009 in PCT/EP09/005892 filed Aug. 7, 2009.

* cited by examiner

PROCESS FOR THE PURIFICATION OF AN AQUEOUS STREAM COMING FROM THE FISCHER-TROPSCH REACTION

The present invention relates to a process for the purification of an aqueous stream coming from the Fischer-Tropsch reaction.

More specifically, the present invention relates to a process for the purification of an aqueous stream coming from the Fischer-Tropsch reaction which comprises subjecting said aqueous stream to one or more pervaporation steps.

The Fischer-Tropsch technology for preparing hydrocarbons from gas mixtures based on hydrogen and carbon monoxide, conventionally known as synthesis gas, is known in scientific literature. A compendium which summarizes the main works on the Fischer-Tropsch reaction is contained in Bureau of Mines Bulletin, 544 (1955) entitled "Bibliography of the Fischer-Tropsch synthesis and Related Processes" H. C. Anderson, J. L. Wiley and A. Newell.

The process for the production of liquid hydrocarbons with the Fischer-Tropsch reaction generates an amount, by weight, of water which is higher than the total amount of hydrocarbons produced, following the production of a mole of water per mole of CO converted into hydrocarbons.

Before purification, the water coming from the Fischer-Tropsch reaction (i.e. co-produced water) is subjected to preliminary separations. Typically, it passes through a three-phase separator from which an organic condensate is obtained, together with a vapour phase and an aqueous phase, which still contains organic compounds, both dissolved and in suspension, and is preferably treated in a coalescence filter.

The water thus separated remains contaminated by hydrocarbon compounds, typically less than 1000 ppm, and oxygenated compounds, soluble in water. The amount of contaminants depends on the catalyst and on the reaction conditions, in particular temperature and pressure. The total amount of oxygenated compounds increases with an increase in the reaction temperature, the group of organic acids more significantly.

The main oxygenated contaminants are light alcohols such as methanol and ethanol, indicatively present from 0.5% by weight to 5% by weight. Heavier alcohols are also present in lower amounts (for example, propanol, butanol, pentanol, etc.) and other oxygenated compounds, such as aldehydes (for example, acetaldehyde, propionaldehyde, butyraldehyde, etc.), ketones (acetone, methylpropylketone, etc.) and acids (for example, formic acid, acetic acid, propionic acid, butyric acid, isobutyric acid, valeric acid, hexanoic acid, heptanoic acid, octanoic acid, etc.), these latter indicatively present at concentrations lower than 1.5% by weight. The amount of compounds present, within each group, decreases with an increase in the molecular weight, and compounds with up to 25 carbon atoms are included. The water can also contain small amounts of nitrogenated and sulfurated compounds deriving from the feedstock used, in addition to traces of metals coming from the reactor. The metals can also be present in the form of suspended solids.

The aqueous stream as such does not have any commercial value and cannot be disposed of as such due to the organic compounds present therein which can cause various drawbacks. For example, oxygenated compounds (acids), confer corrosive properties, hydrocarbons have the tendency to form foams (foaming).

Meteoric waters or other service waters present in the production site can be added to the co-produced water.

A treatment plant of the aqueous stream coming from the Fischer-Tropsch reaction (i.e. co-produced water) is therefore necessary for the reuse of the same within the Fischer-Tropsch process, for example, as process water or as cooling water in the reaction section, or for its outward disposal or for other possible uses, as irrigation water or drinking water.

The treatment or combination of treatments of the co-produced water is determined by the restrictions imposed by the final destination of the same and by the organic compounds present therein.

The treatment plant of the co-produced water is normally of the biological type, which can be preceded by a treatment, typically stripping and/or distillation, to remove the most volatile organic compounds. The water coming from the biological treatment is then normally subjected to a further finishing treatment to remove the solids and, if necessary, also the residual salts from the biological treatment. An approach of this type is described, for example, in U.S. Pat. No. 7,166,219, U.S. Pat. No. 7,150,831 (SASOL) or in international patent application WO 2005/113426 (STATOIL—PETROLEUM OIL & GAS CORPORATION OF SOUTH AFRICA).

When the co-produced water is treated by means of a biological process, the organic compounds contained therein are degraded to $CO_2$ and $H_2O$, or to $CO_2$, $CH_4$ and $H_2O$, and the dosage of the chemicals required by the biological process, whether it be of the aerobic or anaerobic type, leads to the production of a sludge, which can indicatively vary from 0.05 kg to 0.5 kg per kg of COD biodegraded. Biological treatments are, normally, complex and expensive for various reasons such as, for example, the chemicals to be used (for example, urea, phosphates, etc.), which must be variably and accurately dosed according to the type of sludge to be obtained; the large volumes of the treatment tanks/reactors, the times of the biological reactions which are in the order of hours; the air to be insufflated when aerobic treatment is used. Another drawback of the biological treatment is that the organic compounds present in the water cannot be upgraded.

Should the organic compounds present in the co-produced water be upgraded, instead of biodegraded, a physicochemical treatment must be applied. In the american patent U.S. Pat. No. 6,462,097 (IFP-ENI), for example, a process is described in which, after the stripping treatment, an adsorption step on activated carbon is envisaged. Subsequently, the aqueous stream coming from said adsorbing step on activated carbons, rich in organic compounds, can be fed back to the synthesis reactor. Similar suggestions are also mentioned, for example, in american patents U.S. Pat. No. 6,225,358 (SYNTROLEUM CORP), U.S. Pat. No. 5,053,581, U.S. Pat. No. 5,004,862 (EXXON), in which, potentially, the organic compounds, for example $C_1$ to $C_6$ alcohols present in the co-produced water, are transformed and therefore upgraded to simple molecules such as $CO_x/H_2$ (syngas).

Other types of treatment, of a physico-chemical nature, allow one or more aqueous streams enriched in organic compounds to be separated.

A mainly alcoholic stream with an amount of non-acidic compounds (NAC) from 55% by weight up to a max of 85% by weight, can be separated by distillation, for example, as described in US 2004/0262199 (SASOL) and in italian patent application MI07A001209 (ENI). This stream can be used as fuel or, alternatively, it can be further processed to recover valuable products.

The formation, by means of physico-chemical treatments, of one or more streams enriched in different groups of organic compounds, together with the production of water purified to the required degree, is described, for example, in american patent U.S. Pat. No. 7,154,432 (SASOL) in which a process of at least two steps is proposed, the first, a distillation step, the second, membrane separation and optionally, if necessary, other accessory steps, to bring the purified water to the required degree of purity.

In particular, in U.S. Pat. No. 7,154,432 is described a process for the purification of the water co-produced in the Fischer-Tropsch reaction which comprises: (a) subjecting it to distillation or to a liquid-liquid extraction which allows at least a part of the alcohols present in the water co-produced in the Fischer-Tropsch reaction to be removed and producing a first stream enriched in water; and b) subjecting said first stream enriched in water to a separation process by means of membrane which allows to remove at least some solids in suspension and some organic acids in order to obtain purified water. Said separation process by means of membrane can be selected from the group comprising: micro-filtration, ultrafiltration, reverse osmosis, pervaporation.

When the above membrane separation process is effected by pervaporation, said membrane can be selected from membranes based on polyvinyl alcohol (PVA), or mixtures of polyvinyl alcohol (PVA) and polyacrylic acid (PAA), in order to remove organic compounds which do not form azeotropes (i.e. organic acids). Said pervaporation is typically carried out at a pressure lower than 4 mm Hg, at a pH of about 7, and at a temperature ranging from 30° C. to 70° C. Said pervaporation allows a second stream (permeate) enriched in water to be obtained.

The american patent U.S. Pat. No. 5,230,801 (EXXON) describes a process for separating normal-alcohols, in particular n-alcohols having $C_1$-$C_{20}$ carbon atoms, preferably $C_4$-$C_{14}$ carbon atoms, more preferably $C_6$-$C_{11}$ carbon atoms, from mixtures comprising n-paraffins and said n-alcohols, by pervaporation through a dense, non-porous membrane. Said mixtures can derive from the Fischer-Tropsch reaction. Said membrane is preferably a membrane comprising a polyester, more preferably a membrane comprising an aliphatic polyimide/polyester copolymer. The pervaporation is preferably carried out at a temperature higher than or equal to 170° C.

American patent application US 2007/0031954 (MEMBRANE TECHNOLOGY RESEARCH) describes a process for producing and recovering light alcohols, in particular ethanol, mixtures of alcohols comprising ethanol, and mixtures comprising acetone, butanol and ethanol (ABE mixtures), using a combination of steps including: fermentation, a first membrane separation, dephlegmation and dehydration through a second membrane separation. Materials containing fermentable sugars are preferably subjected to fermentation. The membrane separation is preferably carried out by pervaporation.

The Applicant has faced the problem of obtaining a stream enriched in alcohols, in particular light alcohols, from the aqueous stream coming from the Fischer-Tropsch reaction.

It has now been found that by subjecting the aqueous stream coming from the Fischer-Tropsch reaction to a purification process comprising one or more pervaporation steps, it is possible to simply and conveniently proceed with the separation of an aqueous stream enriched in alcohols, in particular light alcohols, and of an aqueous stream enriched in water.

Said alcohols can be advantageously used as automotive fuels, or as components which can be added to automotive fuels.

In accordance with a first aspect, the present invention therefore relates to a process for the purification of an aqueous stream coming from the Fischer-Tropsch reaction which comprises:
feeding said aqueous stream containing the organic by-products of the reaction to one or more pervaporation units, said one or more pervaporation units comprising at least one polymeric pervaporation membrane, obtaining two outgoing streams:
an aqueous stream (i) enriched in alcohols having from 1 to 8 carbon atoms, preferably from 2 to 4 carbon atoms;
an aqueous stream (ii) enriched in water.

Said pervaporation units are generally arranged in series and/or in parallel, depending on the flow-rates, on the performances to be obtained and on the specific flows which pass through the polymeric pervaporation membranes included in said pervaporation units (i.e. flow-rate of permeate in the time unit and per surface unit).

For the purposes of the present invention and following claims, the term "pervaporation unit" refers to the whole equipment necessary for effecting the pervaporation which typically includes a feeding pump, a feeding pre-heater, at least one polymeric pervaporation membrane, an inter-step heat exchanger, a vacuum system for evaporating the aqueous stream permeate side or, alternatively, a sweep gas for evaporating the aqueous stream permeate side, a system which allows the evaporated permeate, either partially or completely, to be brought to a temperature lower than or equal to the so-called dew point, at the operating pressure adopted, in order to condense it.

For the purposes of the present invention and of the following claims, the definitions of the numerical ranges always comprise the extremes unless otherwise specified.

The Fischer-Tropsch reaction can be advantageously carried out as described in the american patent U.S. Pat. No. 6,348,510 whose content is considered as being incorporated herein as reference.

The aqueous stream (i) enriched in alcohols has a concentration of alcohols preferably higher than or equal to 40% by weight, more preferably higher than or equal to 80% by weight, even more preferably higher than or equal to 95% by weight.

The polymeric pervaporation membranes useful for the purposes of the present invention are preferably selected from hydrophilic polymeric membranes, or lipophilic polymeric membranes, more preferably from hydrophilic polymeric membranes.

According to a second aspect, the present invention relates to a process for the purification of an aqueous stream coming from the Fischer-Tropsch reaction which comprises:
feeding said aqueous stream containing organic by-products of the reaction to one or more pervaporation units, said one or more pervaporation units comprising at least one lipophilic polymeric pervaporation membrane, obtaining two outgoing streams:
an aqueous stream (ia) enriched in alcohols having from 1 to 8 carbon atoms, preferably from 2 to 4 carbon atoms;
an aqueous stream (iia) enriched in water;
feeding said aqueous stream (ia) to one or more pervaporation units, said one or more pervaporation units comprising at least one hydrophilic polymeric pervaporation membrane, obtaining two outgoing streams:
an aqueous stream (ib) enriched in alcohols having from 1 to 8 carbon atoms, preferably from 2 to 4 carbon atoms;
an aqueous stream (iib) enriched in water.

The aqueous stream (ia) enriched in alcohols has a concentration of alcohols preferably higher than or equal to 15% by weight, more preferably ranging from 20% by weight to 60% by weight.

The passage through at least a first lipophilic polymeric pervaporation membrane and at least a second hydrophilic polymeric pervaporation membrane allows an aqueous stream (ib) enriched in alcohols to be obtained, having a concentration of alcohols preferably higher than or equal to 80% by weight, even more preferably higher than or equal to 95% by weight.

The process object of the present invention can advantageously comprise a distillation/stripping treatment of the aqueous stream coming from the Fischer-Tropsch reaction.

According to a third aspect, the present invention relates to a process for the purification of an aqueous stream coming from the Fischer-Tropsch reaction, which comprises:

feeding the aqueous stream coming from the Fischer-Tropsch reaction to a distillation or stripping column;
feeding the aqueous stream (ic) enriched in alcohols leaving the head of the above column to one or more pervaporation units, said one or more pervaporation units comprising at least one polymeric pervaporation membrane, obtaining two outgoing streams:
an aqueous stream (id) enriched in alcohols having from 1 to 8 carbon atoms, preferably from 2 to 4 carbon atoms;
an aqueous stream (iid) enriched in water.

The aqueous stream (ic) enriched in alcohols has a concentration of alcohols preferably higher than or equal to 15% by weight, more preferably ranging from 20% by weight to 60% by weight.

The preliminary passage through a distillation or stripping column allows an aqueous stream (id) enriched in alcohols to be obtained, having a concentration of alcohols preferably higher than or equal to 80% by weight, even more preferably higher than or equal to 95% by weight.

On the basis of the specific necessities, additional preliminary, intermediate or final steps can be envisaged, such as, for example, the initial filtration of the aqueous stream coming from the Fischer-Tropsch reaction, or the final dehydration of the aqueous stream(s) enriched in alcohols.

The aqueous streams (ii), (iia), (iib) and (iid), enriched in water, have a water concentration preferably higher than or equal to 95% by weight, more preferably higher than or equal to 99% by weight.

The aqueous streams (ii), (iia), (iib) and (iid), enriched in water, depending on the final use and consequently the degree of purity to be obtained, can be subjected to further purification treatments such as, for example: ion exchange resins, reverse osmosis, electrodialysis, biological treatment.

The hydrophilic polymeric membranes are preferably selected from polymeric membranes including at least one polymer selected from: polyvinyl alcohol, polyvinyl alcohol/polyacrylic acid copolymers, diacetate cellulose, triacetate cellulose, or mixtures thereof. Said polymer is preferably crosslinked. Polymeric membranes including polyvinyl alcohol, polyvinyl alcohol/polyacrylic acid copolymers, preferably cross-linked, are even more preferable.

Suitable for the purpose of the present invention are the hydrophilic membranes commercially available such as, for example, PERVAP® 2200, PERVAP® 2201, PERVAP® 2202, PERVAP® 2205, PERVAP® 2210, PERVAP® 2510, of Sulzer.

The lipophilic polymeric membranes are preferably selected from polymeric membranes including at least one polymer selected from: nitrile rubber, neoprene, polydimethylsiloxane (silicon rubber), polyethylene chlorosulfonate, polysilicone-carbonate copolymers, fluoroelastomers, plasticised polyvinyl-chloride, polyurethane, cis-polybutadiene, cis-polyisoprene, polychloroprene, poly(butene-1), ethylene/propylene copolymers, ethylene/propylene/diene terpolymers, polystyrene/butadiene co-polymers, styrene/butadiene/styrene block copolymers, styrene/ethylene/butylene block copolymers, thermoplastic polyolefin elastomers, polyester amides, polyether and polyester block copolymers, or mixtures thereof. Said polymer is preferably crosslinked. Polymeric membranes including polyalkylsiloxane, preferably polydimethylsiloxane, more preferably crosslinked, are even more preferred.

Lipophilic polymeric membranes including polydimethylsiloxane impregnated with particles of at least one hydrophobic zeolite such as, for example, silicalites, can be equally advantageously used for the purposes of the present invention.

Lipophilic membranes commercially available, such as, for example PERVAP® 4060 of Sulzer are suitable for the purposes of the present invention.

The above polymeric membranes, both lipophilic and hydrophilic, can be in the form of homogeneous membranes, asymmetrical membranes, multilayer composite membranes, matrix membranes incorporating a layer of gel or a layer of liquid, or in any other form known in the art. They are preferably in the form of multilayer composite membranes comprising a base layer, a porous supporting layer and a layer comprising at least one or more of the polymers reported above. Base layers which can be useful for the purpose are generally flexible woven or non-woven fabrics having a high porosity, comprising fibres including metallic fibres, polyolefin fibres, polysulfone fibres, polyetherimide fibres, polyphenylene sulfide fibres, carbon fibres, or mixtures thereof; porous structures comprising glass, ceramics, graphite, metals, are equally useful. The porous supporting layer preferably has an asymmetrical porous structure. Said porous supporting layer can be produced, for example, from polyacrylonitrile, polysulfone, polyethersulfone, polyetherimide, polyvinylidene fluoride, hydrolyzed cellulose triacetate, polyphenylene sulfide, polyacrylonitrile, polytetrafluoroethylene, polyethylene, polyvinyl alcohol, copolymers of trifluorinated polyolefins, or other useful polymers, or mixtures thereof.

The above polymeric membranes, both hydrophilic and lipophilic, can be in the form of flat sheets, empty fibres, tubular membranes, or in other useful forms.

The aqueous stream containing the reaction organic by-products is fed to the pervaporation unit at a temperature ranging from 20° C. to 100° C., more preferably from 30° C. to 70° C.

In the feeding side (retentate side) of said one or more pervaporation units, the operating pressure ranges from 0.5 bar to 5 bar, more preferably from 1 bar to 2.5 bar.

In the permeate side of said one or more pervaporation units the operating pressure ranges from 0.0005 bar to 0.5 bar, more preferably from 0.001 bar to 0.25 bar.

The total flow mass (kg of permeate per square meter of surface of the polymeric membrane per hour) preferably ranges from 0.05 kg/(m$^2$×h) to 10 kg/(m$^2$×h), more preferably from 0.1 kg/(m$^2$×h) to 8 kg/(m$^2$×h).

The aqueous streams enriched in alcohols can be used as such or they can be subjected to further processes, for example distillation, in order to separate the various alcohols present therein.

According to a fourth aspect, the present invention therefore relates to the use of the alcohols obtained, in accordance with the processes described above as automotive fuels, or as components which can be added to automotive fuels.

Figure 2:
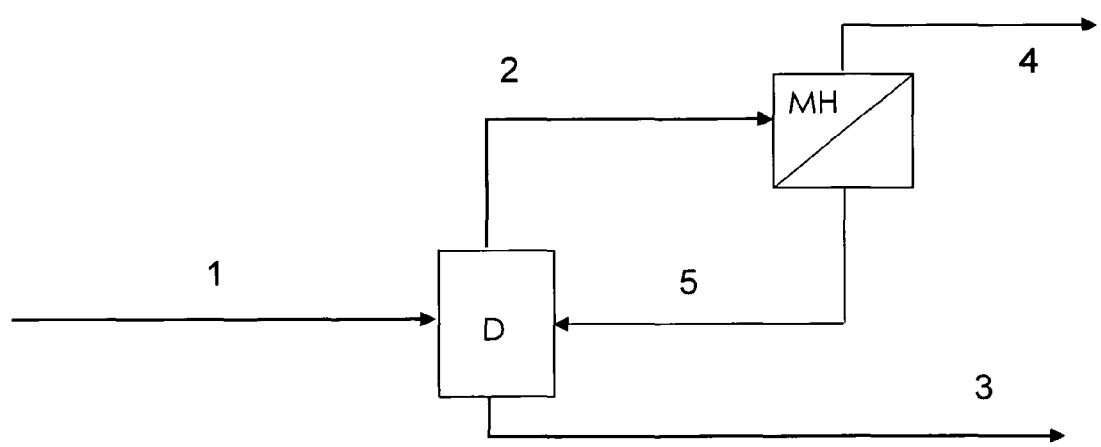

The present invention will now be described in greater detail through various illustrative forms with reference to FIGS. 1-2 shown hereunder.

The process of the present invention can be carried out as represented, for example, in FIG. 1.

In this case, the aqueous stream coming from the Fischer-Tropsch reaction is fed (stream 1) to a pervaporation unit comprising a lipophilic polymeric membrane (ML), obtaining an aqueous stream enriched in alcohols (stream 2) (permeate) and an aqueous stream enriched in water (stream 3) (retentate).

Stream 3 can be subjected to the purification treatments described above, or it can be recycled to the above pervaporation unit comprising a lipophilic polymeric membrane (ML) (not represented in FIG. 1).

The aqueous stream enriched in alcohols (stream 2) (permeate), after condensation, is fed to a subsequent pervaporation unit comprising a hydrophilic polymeric membrane (MH) obtaining an aqueous stream (stream 4) (retentate) more enriched in alcohols and an aqueous stream (stream 5) (permeate) more enriched in water.

Stream 5 can be subjected to the purification treatments described above, or it can be recycled to the above pervaporation unit comprising a lipophilic polymeric membrane (ML) (not represented in FIG. 1).

Alternatively, the process of the present invention can be effected as represented in FIG. 2.

In this case, the aqueous stream coming from the Fischer-Tropsch reaction (stream 1) is fed to a distillation column (D) obtaining an aqueous stream at the head (stream 2) enriched in alcohols and an aqueous stream at the bottom (stream 3) enriched in water.

Stream 3 can be subjected to the purification treatments described above, or it can be recycled to the above distillation column (D) (not represented in FIG. 2).

The aqueous stream at the head (stream 2) is fed to a pervaporation unit comprising a hydrophilic polymeric membrane (MH) obtaining a stream more enriched in alcohols (retentate) (stream 4), and a stream enriched in water (permeate) (stream 5) which, as represented in FIG. 2, can be re-fed to the distillation column (D).

Alternatively, the stream 5 can be subjected to the purification treatments described above.

Some illustrative and non-limiting examples are provided for a better understanding of the present invention and for its embodiment.

EXAMPLE 1

After having carried out the Fischer-Tropsch reaction as described in american patent U.S. Pat. No. 6,348,510 (IFP-ENI) and with reference to FIG. 2, the water which is separated by decanting from the reaction effluent (stream 1) is fed to a distillation column (D). An aqueous stream rich in alcohols (stream 2) is separated from the head of the distillation column, whose composition, obtained by means of gaschromatography is reported in Table 1 (column A) and an aqueous stream leaving the bottom of the distillation column enriched in water (stream 3).

The above stream 2 is fed to a flask situated on a technical balance and sent, by means of a volumetric pump, to the "liquid side" of a laboratory pervaporation cell.

The pervaporation cell houses a flat hydrophilic polymeric membrane (PERVAP® 2210) having a useful diameter equal to 5.8 cm, equivalent to 26.4 cm$^2$.

The pervaporation cell comprises a chamber which is situated under said membrane ("vapour side") and a chamber which is situated above said membrane ("liquid side"). The two chambers are in contact only through said membrane.

Said membrane rests above a sintered steel septum having a high porosity. The "liquid side" chamber has a distribution system of the liquid which produces a liquid film having a thickness which is lower than 2 mm, said liquid film being in contact with the membrane.

The overall hold-up of liquid (flask+pervaporation cell) is equal to 1000.9 g.

The pervaporation cell is also housed inside an oven which allows the test to be conditioned at the desired temperature: in this case 58° C.

The "vapour side" is brought into vacuum by suction with a membrane pump and is maintained at pressures of 5-10 mBar.

The conditions described above are maintained for 600 hours during which the average specific flow of permeate is equal to 0.39 kg/(m$^2$×h), allowing a total of 618.9 g of permeate to be collected.

The overall balance of material is equal to 980 (permeate+condensate weight+samplings for analysis+final retentate/weight charged initially into the flask).

The retentate (stream 4) and the permeate (stream 5) are subjected to gaschromatography: the results obtained are reported in Table 1 (column B) and column (C) respectively.

TABLE 1

|  | A<br>Stream 2 | B<br>Stream 4<br>(retentate) | C<br>Stream 5<br>(permeate) |
|---|---|---|---|
| Water (weight %) | 42.0 | 1.5 | 67.1 |
| Alcohols (weight %) |  |  |  |
| $C_1H_4O$ | 33.0 | 48.0 | 23.3 |
| $C_2H_6O$ | 12.6 | 24.6 | 4.9 |
| $C_3H_8O$ | 6.6 | 13.8 | 2.3 |
| $C_4H_{10}O$ | 4.0 | 8.6 | 1.5 |
| $C_5H_{12}O$ | 1.6 | 2.9 | 0.9 |
| Total (weight %) | 58.0 | 98.5 | 32.9 |

The invention claimed is:

1. A process for purifying a first aqueous stream coming from a Fischer-Tropsch reaction, the first aqueous stream comprising an aldehyde, a ketone, an acid, a nitrogenated compound, a sulfurated compound, and traces of metals, the process comprising:
    feeding the first aqueous stream to at least one pervaporation unit, wherein the at least one pervaporation unit comprises at least one polymeric pervaporation membrane, to obtain two outgoing streams:
    (i) a second aqueous stream enriched in at least one alcohol having from 1 to 8 carbon atoms, with respect to said first aqueous stream; and
    (ii) a third aqueous stream enriched in water, wherein said first aqueous stream is fed to said at least one pervaporation unit without any intervening distillation.

2. The process of claim 1, wherein the second aqueous stream (i) is enriched in at least one alcohol having from 2 to 4 carbon atoms.

3. The process of claim 1, wherein the second aqueous stream (i) has an alcohol concentration higher than or equal to 40% by weight.

4. The process of claim 3, wherein the second aqueous stream (i) has an alcohol concentration higher than or equal to 80% by weight.

5. The process of claim 4, wherein the second aqueous stream (i) has an alcohol concentration higher than or equal to 95% by weight.

6. A process for purifying a first aqueous stream coming from a Fischer-Tropsch reaction, the first aqueous stream comprising an aldehyde, a ketone, an acid, a nitrogenated compound, a sulfurated compound, and traces of metals, the process comprising:
feeding the first aqueous stream to at least one pervaporation unit, wherein the at least one pervaporation unit comprises at least one polymeric pervaporation membrane, to obtain two outgoing streams:
(i) a second aqueous stream enriched in at least one alcohol having from 1 to 8 carbon atoms, with respect to said first aqueous stream; and
(ii) a third aqueous stream enriched in water,
wherein said first aqueous stream is fed to said at least one pervaporation unit without any intervening distillation,
wherein the third aqueous stream (ii) has a water concentration higher than or equal to 95% by weight.

7. The process of claim 1, wherein the polymeric pervaporation membrane is at least one selected from the group consisting of a hydrophilic polymeric membrane and a lipophilic polymeric membrane.

8. The process of claim 7, wherein the polymeric pervaporation membrane is at least one hydrophilic polymeric membrane.

9. The process of claim 7, wherein the at least one hydrophilic polymeric membrane is present and comprises at least one polymer selected from the group consisting of polyvinyl alcohol, a polyvinyl alcohol/polyacrylic acid copolymer, cellulose diacetate, and cellulose triacetate.

10. The process of claim 9, wherein the at least one polymer is cross-linked.

11. The process of claim 9, wherein the at least one polymer is selected from the group consisting of polyvinyl alcohol and a polyvinyl alcohol/polyacrylic acid copolymer.

12. The process of claim 7, wherein the at least one lipophilic polymeric membrane is present and comprises at least one polymer selected from the group consisting of nitrile rubber, neoprene, polydimethylsiloxane (silicon rubber), polyethylene chlorosulfonate, a polysilicone-carbonate copolymer, a fluoroelastomer, a plasticized polyvinyl chloride, a polyurethane, cis-polybutadiene, cis-polyisoprene, polychloroprene, poly(butene-1), an ethylene/propylene copolymer, an ethylene/propylene/diene terpolymer, a polystyrene/butadiene copolymer, a styrene/butadiene/styrene block copolymer, a styrene/ethylene/butylene block copolymer, a thermoplastic polyolefin elastomer, a polyesteramide, and a polyether and polyester block copolymer.

13. The process of claim 12, wherein the at least one polymer is cross-linked.

14. The process of claim 12, wherein the at least one polymer is polyalkylsiloxane.

15. The process of claim 1, wherein the first aqueous stream is fed to the at least one pervaporation unit at a temperature ranging from 20° C. to 100° C.

16. The process of claim 15, wherein the first aqueous stream is fed to the at least one pervaporation unit at a temperature ranging from 30° C. to 70° C.

17. The process of claim 1, wherein, on a feeding side (retentate side) of the at least one pervaporation unit, an operating pressure ranges from 0.5 bar to 5 bar.

18. The process of claim 17, wherein, on the feeding side (retentate side) of the at least one pervaporation unit the operating pressure ranges from 1 bar and 2.5 bar.

19. The process of claim 1, wherein, on a permeate side of the at least one pervaporation unit, an operating pressure ranges from 0.0005 bar to 0.5 bar.

20. The process of claim 19, wherein on the permeate side of the at least one pervaporation unit the operating pressure ranges from 0.001 bar to 0.25 bar.

21. The process of claim 1, wherein a total flow mass ranges from 0.05 kg/(m$^2$×h) to 10 kg/(m$^2$×h).

22. The process of claim 21, wherein the total flow mass ranges from 0.1 kg/(m$^2$×h) to 8 kg/(m$^2$×h).

23. A process for purifying a first aqueous stream coming from a Fischer-Tropsch reaction, the first aqueous stream comprising an aldehyde, a ketone, an acid, a nitrogenated compound, a sulfurated compound, and traces of metals, the process comprising:
(I) feeding the first aqueous stream to at least one pervaporation unit, wherein the at least one pervaporation unit comprises at least one lipophilic polymeric pervaporation membrane, to obtain two outgoing streams:
(ia) a second aqueous stream enriched in at least one alcohol having from 1 to 8 carbon atoms, with respect to said first aqueous stream, and
(iia) a third aqueous stream enriched in water; and
(II) feeding the second aqueous stream (ia) to at least one pervaporation unit, wherein the at least one pervaporation unit comprises at least one hydrophilic polymeric pervaporation membrane, to obtain two outgoing streams:
(ib) a fourth aqueous stream enriched in at least one alcohol having from 1 to 8 carbon atoms, and
(iib) a fifth aqueous stream (iib) enriched in water,
wherein said first aqueous stream is fed to said at least one pervaporation unit without any intervening distillation.

24. The process of claim 23, wherein the fourth aqueous stream (ib) is enriched in at least one alcohol having from 2 to 4 carbon atoms.

25. The process of claim 23, wherein the fourth aqueous stream (ib) has an alcohol concentration higher than or equal to 80% by weight.

26. The process of claim 25, wherein the fourth aqueous stream (ib) has an alcohol concentration higher than or equal to 95% by weight.

27. The process of claim 23, wherein the at least one lipophilic polymeric pervaporation membrane comprises at least one polymer selected from the group consisting of nitrile rubber, neoprene, polydimethylsiloxane (silicon rubber), polyethylene chlorosulfonate, a polysilicone-carbonate copolymer, a fluoroelastomer, a plasticized polyvinyl chloride, a polyurethane, cis-polybutadiene, cis-polyisoprene, polychloroprene, poly(butene-1), an ethylene/propylene copolymer, an ethylene/propylene/diene terpolymer, a polystyrene/butadiene copolymer, a styrene/butadiene/styrene block copolymer, a styrene/ethylene/butylene block copolymer, a thermoplastic polyolefin elastomer, a polyesteramide, and a polyether and polyester block copolymer.

28. The process of claim 23, wherein the at least one hydrophilic polymeric pervaporation membrane comprises at least one polymer selected from the group consisting of polyvinyl alcohol, a polyvinyl alcohol/polyacrylic acid copolymer, cellulose diacetate, and cellulose triacetate.

29. The process of claim 23, wherein the first aqueous stream is fed to the at least one pervaporation unit at a temperature ranging from 20° C. to 100° C.

30. A process for purifying a first aqueous stream coming from a Fischer-Tropsch reaction, the first aqueous stream comprising an aldehyde, a ketone, an acid, a nitrogenated compound, a sulfurated compound, and traces of metals, the process comprising:
(I) feeding the first aqueous stream to a distillation or stripping column, to obtain a distilled aqueous stream (ic), which is enriched in at least one alcohol, with respect to said first aqueous stream; and (II) feeding the distilled aqueous stream (ic) leaving a head of the distillation or stripping column to at least one pervaporation unit, wherein the at least one pervaporation unit comprises at least one polymeric pervaporation membrane, to obtain two outgoing streams:
(id) a second aqueous stream (id) enriched in at least one alcohol having from 1 to 8 carbon atoms, and
(iid) a third aqueous stream enriched in water.

31. The process of claim 30, wherein the second aqueous stream (id) is enriched in at least one alcohol having from 2 to 4 carbon atoms.

32. The process of claim 30, wherein the second aqueous stream (id) has an alcohol concentration higher than or equal to 80% by weight.

33. The process of claim 32, wherein the second aqueous stream (id) has an alcohol concentration higher than or equal to 95% by weight.

34. The process of claim 30, wherein the at least one polymeric pervaporation membrane is at least one selected from the group consisting of a hydrophilic polymeric membrane and a lipophilic polymeric membrane.

35. The process of claim 30, wherein the first aqueous stream is fed to the at least one pervaporation unit at a temperature ranging from 20° C. to 100° C.

36. A method of making an automotive fuel or a component that can be added to an automotive fuel, the method comprising:
combining an alcohol from the first stream, obtained by the method of claim 1, with the fuel.

37. The process of claim 1, consisting of:
feeding the first aqueous stream to at least one pervaporation unit, wherein the at least one pervaporation unit comprises at least one polymeric pervaporation membrane, to obtain two outgoing streams:
(i) a second aqueous stream enriched in at least one alcohol having from 1 to 8 carbon atoms; and
(ii) a third aqueous stream enriched in water.

38. The process of claim 6, wherein the third aqueous stream (ii) has a water concentration higher than or equal to 99% by weight.

* * * * *